United States Patent
Knowles

(10) Patent No.: US 11,179,656 B2
(45) Date of Patent: Nov. 23, 2021

(54) INTEGRATED LATCH/HOLD-OPEN SYSTEM FOR NEFCO LAUNDER COVERS

(71) Applicant: NEFCO Systems, Inc., Palm Beach Gardens, FL (US)

(72) Inventor: Thaddeus J. Knowles, Stuart, FL (US)

(73) Assignee: NEFCO Systems, Inc., Palm Beach Gardens, FL (US)

(*) Notice: Subject to any disclaimer, the term of this patent is extended or adjusted under 35 U.S.C. 154(b) by 0 days.

(21) Appl. No.: 17/074,413

(22) Filed: Oct. 19, 2020

(65) Prior Publication Data

US 2021/0245076 A1 Aug. 12, 2021

Related U.S. Application Data

(60) Provisional application No. 62/972,097, filed on Feb. 10, 2020.

(51) Int. Cl.
| | |
|---|---|
| *B01D 21/24* | (2006.01) |
| *B01D 21/02* | (2006.01) |
| *B01D 21/00* | (2006.01) |

(52) U.S. Cl.
CPC ......... *B01D 21/02* (2013.01); *B01D 21/0003* (2013.01); *B01D 21/0006* (2013.01); *B01D 21/2444* (2013.01)

(58) Field of Classification Search
CPC ............ B01D 21/0003; B01D 21/0006; B01D 21/02; B01D 21/2444
USPC ................................................. 210/540, 541
See application file for complete search history.

(56) References Cited

U.S. PATENT DOCUMENTS

| | | | | |
|---|---|---|---|---|
| 4,391,704 A | * | 7/1983 | Anderson | B01D 21/0003 210/539 |
| 4,767,536 A | * | 8/1988 | Roley | B01D 21/2444 210/532.1 |
| 5,670,045 A | * | 9/1997 | Schaller | B01D 21/0003 210/540 |
| 5,965,023 A | * | 10/1999 | Schaller | B01D 21/0003 210/540 |
| 6,712,222 B2 | * | 3/2004 | Schaller | B01D 21/02 210/540 |
| 7,591,381 B2 | * | 9/2009 | Schaller | B01D 21/0006 210/540 |
| 9,174,148 B2 | * | 11/2015 | Schaller | B01D 21/2444 |
| 9,873,068 B2 | * | 1/2018 | Schaller | B01D 21/0006 |
| 11,052,329 B1 | * | 7/2021 | Janssen | B01D 21/2444 |
| 2016/0236116 A1 | * | 8/2016 | Schaller | B01D 21/0003 |
| 2018/0036654 A1 | * | 2/2018 | Schaller | B01D 21/0003 |
| 2021/0046404 A1 | * | 2/2021 | Morgan | B01D 21/0003 |

FOREIGN PATENT DOCUMENTS

DE 4226709 * 2/1994

* cited by examiner

*Primary Examiner* — Christopher Upton
(74) *Attorney, Agent, or Firm* — Sofer & Haroun, LLP

(57) ABSTRACT

A system is provided for covering a launder channel of a clarifier tank, the launder channel having a tank wall and launder channel wall. The system comprises a mounting section connected to the launder channel wall, a hinge, and an openable cover panel, movable between a closed and open position. The mounting section includes an angled resting structure for supporting the cover panel, when in the open position, away from the mounting section.

14 Claims, 5 Drawing Sheets

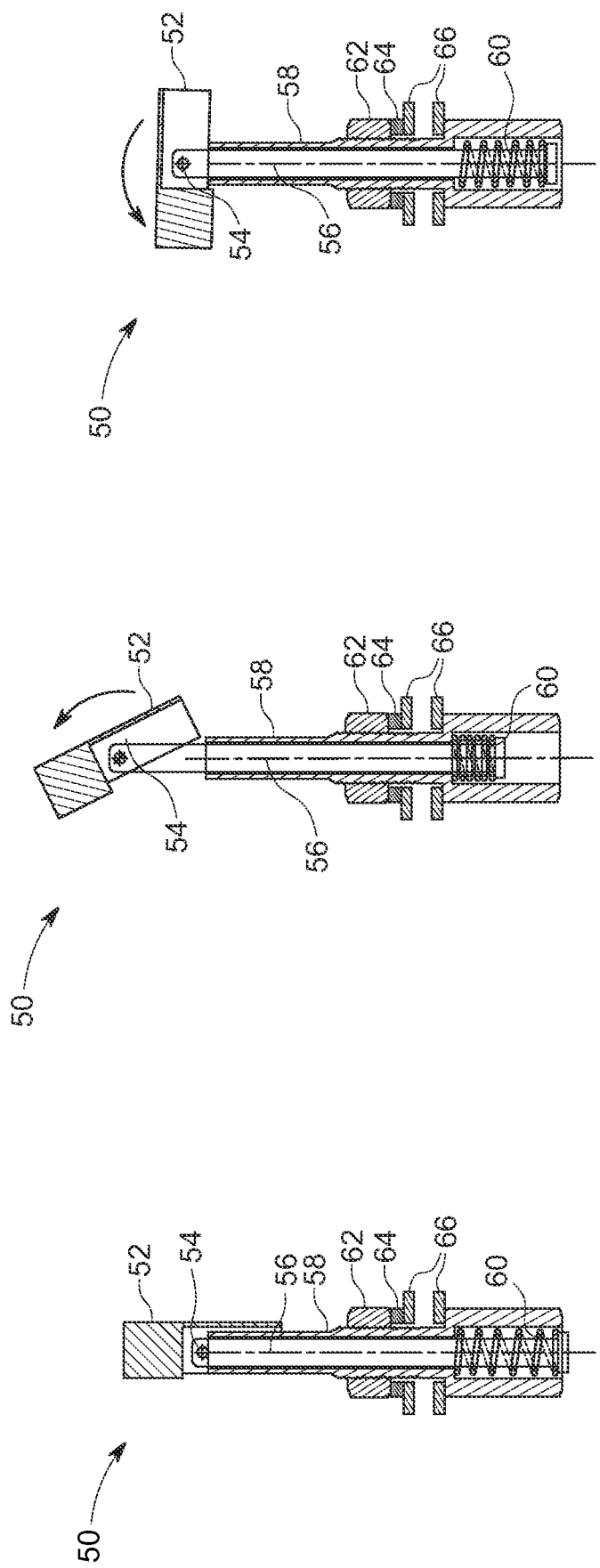

INTEGRATED LATCH/HOLD-OPEN SYSTEM FOR NEFCO LAUNDER COVERS

RELATED APPLICATION

The present application claims the benefit of U.S. Provisional Patent Application No. 62/972,097, filed on Feb. 10, 2020, the entirety of which is incorporated by reference.

FIELD OF THE INVENTION

The present arrangement relates to launder covers. More particularly, the present arrangement relates to an integrated latch/hold-open system for launder channel covers.

DESCRIPTION OF RELATED ART

In the prior art, launder channel covers are typically designed with a restraint cable as shown in prior art FIG. 1. This restraint cable is used to keep the cover panel from over rotating outward and/or obstructing a sweep arm mechanism that cleans the weir/scum baffle.

In another prior art arrangement shown in FIG. 2 a prop-rod may be used to hold the cover panel in an open position for cleaning, while keeping it from over rotating in either direction to prevent damage to the sweep arm mechanism or to the support flange on the tank wall.

However, the restraint cable of FIG. 1 does not have the ability to prevent the cover from quickly closing down on the support flange on the tank wall. If the cover panel closes to fast, it slams on the support flange and can break the flange or the panel.

The prop-rod from prior art FIG. 2 creates an obstruction for someone walking through the launder channel. Also, such designs are prone to accidental disengagement causing quick over rotation in either direction which can likewise damage the cover panel.

OBJECTS AND SUMMARY

The present arrangement overcomes the drawbacks associated with the prior art and provides an integrated latch system/hold open arrangement to hold the panel cover in an open position allowing an unobstructed pathway in the launder channel and access for cleaning of the weir and/or launder channel. In one embodiment, the integrated latch system/hold open arrangement is located on a resting structure on the mounting section of the cover panel and an associated locking post/locking pin to hold the panel cover in an open position allowing access and cleaning of the launder channel.

To this end a system is provided for covering a launder channel of a clarifier tank, the launder channel having a tank wall and launder channel wall. The system comprises a mounting section connected to the launder channel wall, a hinge, and an openable cover panel, movable between a closed and open position. The mounting section includes an angled resting structure for supporting the cover panel, when in the open position, away from the mounting section.

In another embodiment a system for covering a launder channel of a clarifier tank is provided, the launder channel having a tank wall and launder channel wall. The system includes a mounting section connected to the launder channel wall, a hinge and an openable cover panel, movable between a closed and open position. The mounting section includes a locking post configured to be passed through a receiving hole to support said cover panel in said open position.

BRIEF DESCRIPTION OF THE FIGURES

FIGS. 8A-8C shows different stages of locking and un-locking of the locking post/pin.

DETAILED DESCRIPTION

Figure 1:
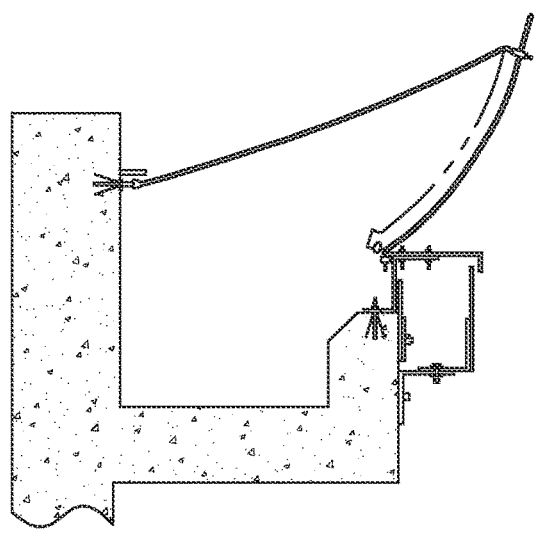
FIG. 1 is a prior art image of a launder channel cover with a restraint cable.
Figure 2:
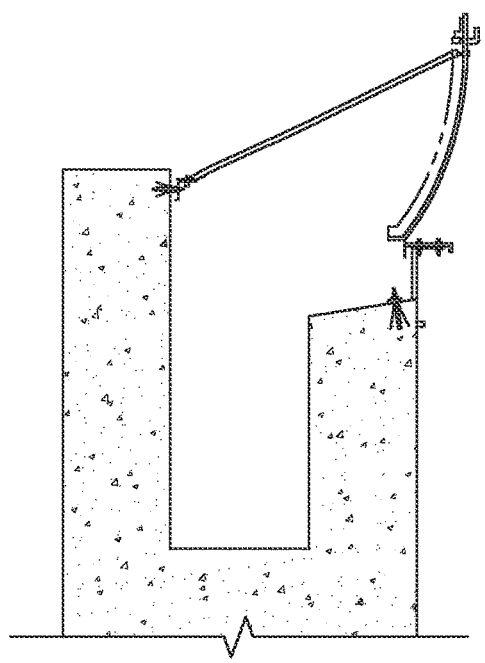
FIG. 2 is a prior art images of a launder channel cover with prop-rod.
Figure 3:
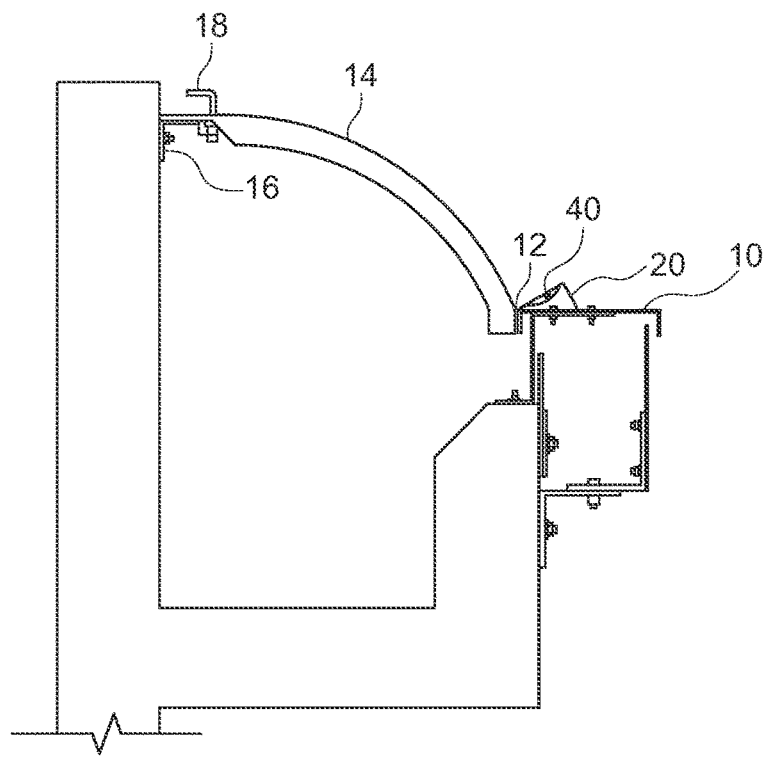
FIG. 3 shows a launder channel cover with a resting structure and locking post/pin in a first closed arrangement, in accordance with one embodiment.
Figure 4:
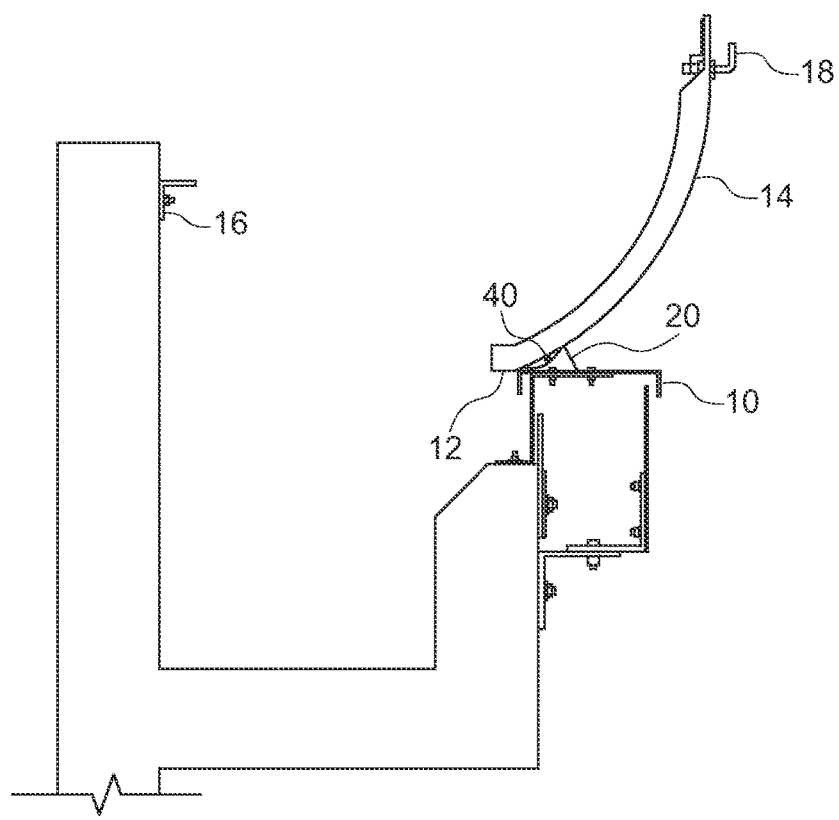
FIG. 4 shows the launder channel cover with a resting structure and locking post/pin from FIG. 3 in a second open arrangement, in accordance with one embodiment.
Figure 5:
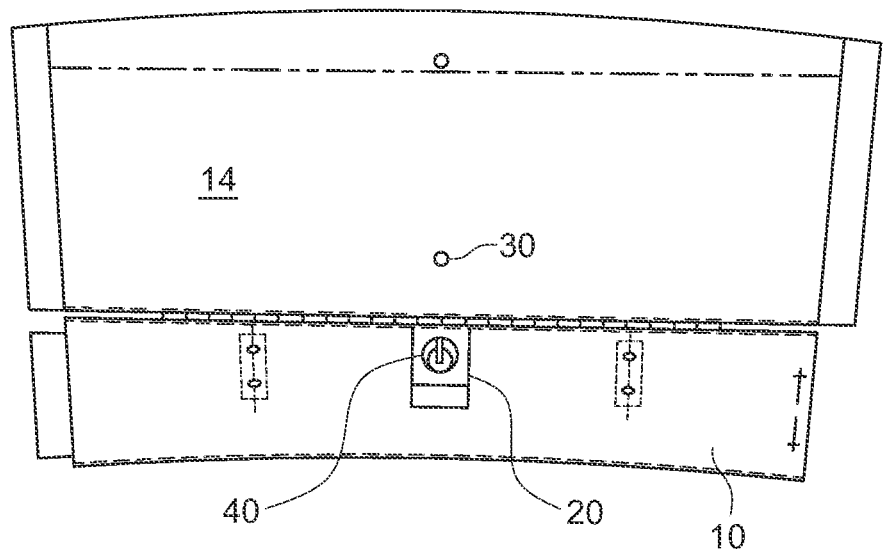
FIG. 5 shows a launder channel cover with a resting structure and locking post/pin from FIG. 3 from a top view in the first closed arrangement, in accordance with one embodiment.

In one embodiment, FIGS. 3-5 illustrate a partial view of a launder channel formed from a tank wall, a channel wall and an attached weir. This launder channel is disposed around the upper periphery of a sewage treatment launder tank. In FIGS. 3-4, attached to the channel wall is a scum baffle as well as a weir, and it is understood that additional launder channel equipment could be implemented as well.

Attached to the top of the channel wall, a panel mounting section 10 is provided. Panel mounting section 10 may be supported by attachment to the top of the channel wall or may be alternatively supported by other means, such as connection to an integrated scum baffle mounting bracket (not shown).

At the side of mounting section 10, closest to the tank wall, a hinge 12 connects with an openable cover panel 14. Cover panel 14 spans across the launder channel and rests on a support flange 16. Panel 14 has a rotating lock handle 18 that can secure the far end of cover panel 14 to support flange 16. In the Figures, panel 14 represent a single panel segment of a larger panel arrangement that covers the entire launder channel. For the purposes of illustration, the salient features of the present invention are demonstrated on the single illustrated panel 14.

Located on the top of mounting section 10, proximate hinge 12, an angled resting structure 20 is provided. FIG. 3 shows cover panel 14 in a closed arrangement covering the launder channel. FIG. 4 shows cover panel 14 in an open position, pivoted on hinge 12, allowing access to the inside of the launder channel for cleaning or inspection. As shown in FIG. 4, an end of cover panel 14 located proximate hinge 12 rests on angled resting structure 20.

In one embodiment, resting structure 20 stops cover panel 14 from over-rotating contacting mounting section 10 or the sweep arm mechanism of the launder channel. The angle of resting structure 20 can be varied as long as it sufficiently allows cover panel 14 to open far enough to allow cleaning of the launder channel but not to over rotate as mentioned above, or to damage hinge 12.

For example, resting structure 20 may be set at 30° above the flat (horizontal) upper surface of mounting section 10. However, it is noted that, as shown in the figures, cover panel 14 is curved. Different cover panels 14 for different types of launder channels can have different curvatures and thus the ideal angle of resting structure 20 from mounting section 10 can set accordingly. To this end, in one arrangement the angle of resting structure 20 can be set to be of at a position that would contact panel 14 at the point when hinge 12 is unfolded to approximately 90° (as seen in FIG. 4) or the angle of resting structure 20 can be set to be at a position that would contact panel 14 when the center of gravity just allows cover panel 14 to fall towards mounting section 10 (just past tipping point). Moreover, in all cases, resting structure 20, regardless of the angle from mounting structure 10, can be arcuately formed in a concave manner to fully contact the corresponding curved portion of cover panel 14.

Such an arrangement eliminates the need for the restraint cable or prop-rod of the prior art, allowing for unobstructed cleaning of the launder channel and further prevents accidental overaction or damage to the mounting arrangements or sweeping mechanisms.

As shown in FIG. 5 in plan view, cover panel 14 has a receiving hole 30 and angled resting structure 20 includes a locking post 40 to stabilize cover panel 14 when in the open position. As described in more detail below, locking post 40 includes mechanisms that secures panel 14 in the open position and prevents accidental closing during cleaning or inspection.

Figure 6:
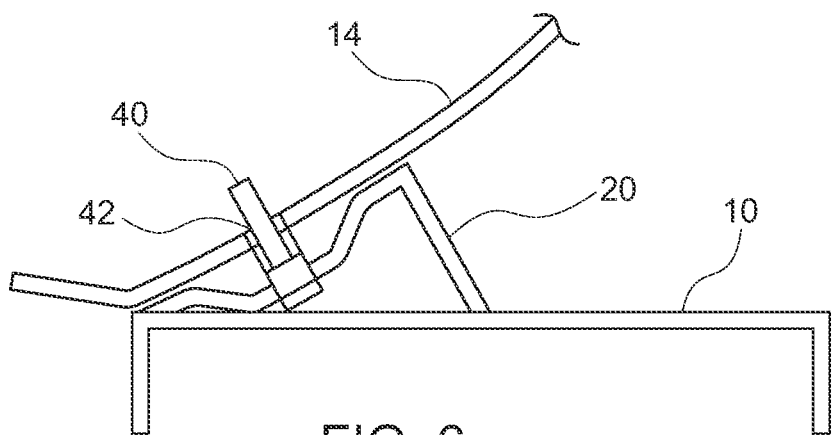
FIG. 6 is a close-up side view of the resting structure and locking post/pin from FIGS. 3-5.
Figure 7:
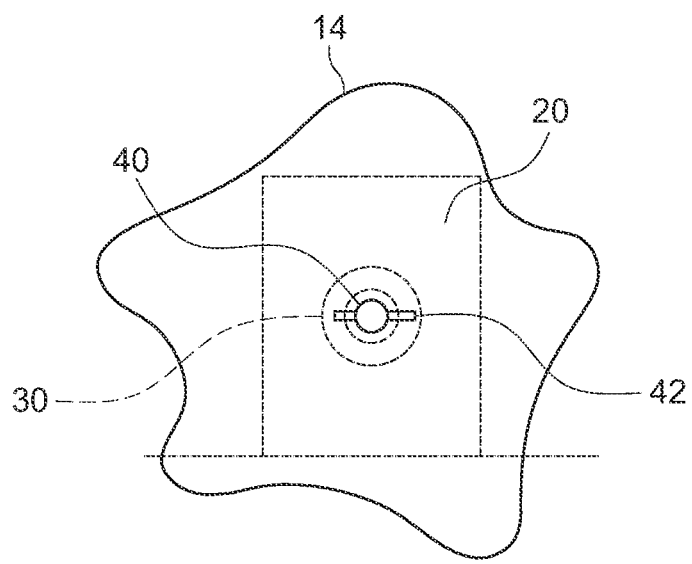
FIG. 7 is a close-up top view of the resting structure and locking post/pin from FIGS. 3-5.

For example, in close-up FIG. 6, mounting section 10 and angled resting structure 20 is shown including locking post 40 that passes through receiving hole 30 in cover panel 14. Once locking post 40 passes through receiving hole 30, a locking pin 42 may be passed, transverse, through locking post 40 to prevent cover panel 14 from accidentally closing. FIG. 7 shows an alternative plan view of close-up FIG. 6 illustrating the relationship between locking pin 42, locking post 40, cover panel 14 and receiving hole 30.

In another embodiment, an alternative spring-loaded locking post 50 is shown in FIGS. 8A-8C. Such locking post 50 may be used in place of locking post 40 on angled resting structure 20 discussed above in FIGS. 3-7. In this arrangement, locking post 50 has a handle 52, a pin 54, a shaft 56, a barrel 58, a spring 60, a nut 62, a washer 64, and a locking nut 66. Handle 52 is connected in a pivotable manner to shaft 56 via pin 54. The far end of shaft 56 is connected to spring 60. This allows handle 52 to be spring loaded to be pulled away from barrel 58 (on which it initially rests against), and also rotatable about pin 54 (as shown in FIGS. 8B and 8C).

In a closed un-locked position, handle 52 is in line with shaft 56 and barrel 58. As shown in FIG. 8B handle 52 is pulled up by the user, against the force of spring 60 and connected shaft 56 so that handle 52 is free to rotate on pin 54 to be perpendicular to barrel 58. Finally, as shown in FIG. 8C, handle 50 is set perpendicular to the top of barrel 58 and is pulled down in a locked position by the retraction of spring 60 and shaft 56. The remaining components of nut 62, washer 64, and locking nut 66 are used to connect locking post 50 to angled resting structure 20 (so that it is a removable feature).

Figure 9A:
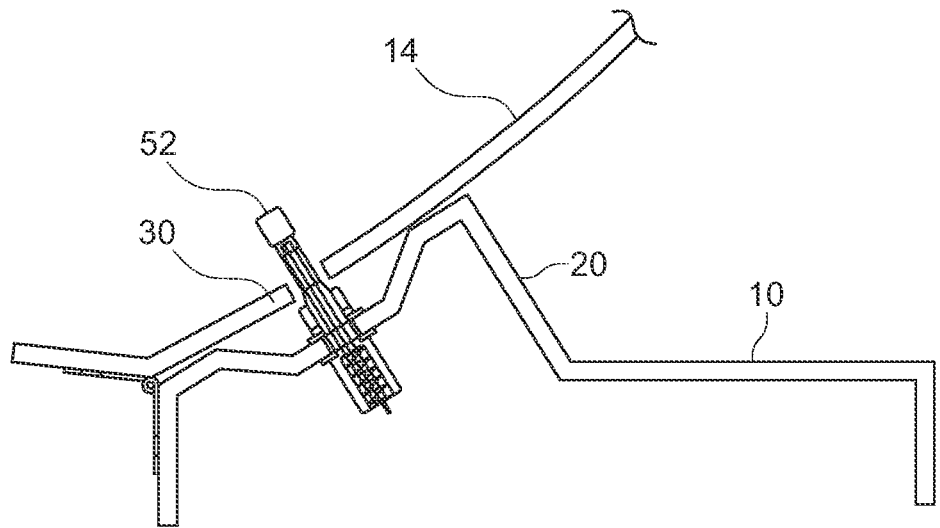
FIGS. 9A-9B shows the resting structure, cover panel, and locking post/pin in the locked and un-locked position.
Figure 9B:
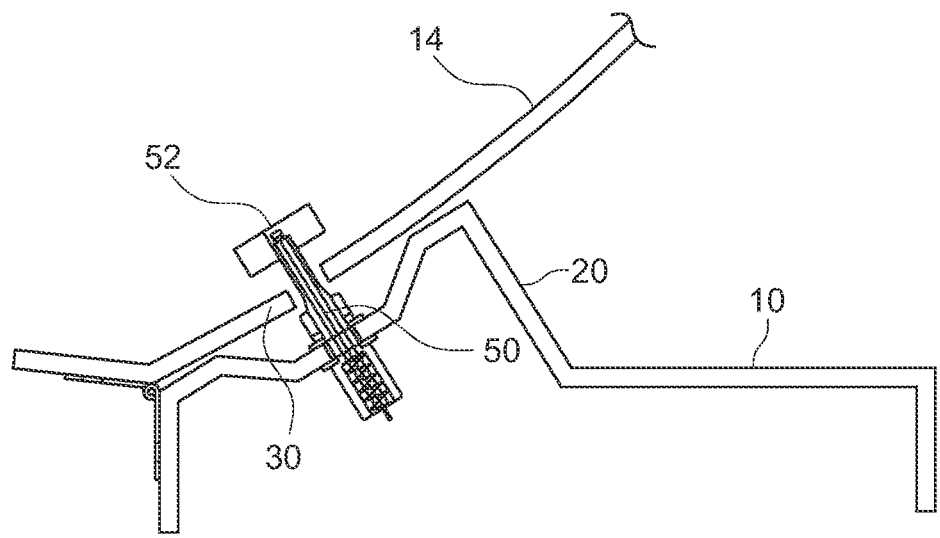

FIGS. 9A and 9B show locking post 50 in a side view, with cover panel 20 open, and post 20 disposed through receiving opening 30. FIG. 9A illustrates handle 52 in the open/un-locked pass through position (FIG. 8A) and FIG. 9B shows handle 52 in the closed/locked position (FIG. 8C).

While only certain features of the invention have been illustrated and described herein, many modifications, substitutions, changes or equivalents will now occur to those skilled in the art. It is therefore, to be understood that this application is intended to cover all such modifications and changes that fall within the true spirit of the invention.

What is claimed is:

1. A system for covering a launder channel of a clarifier tank, the launder channel having a tank wall and launder channel wall, said system comprising:
   a mounting section connected to said launder channel wall;
   a hinge;
   an openable cover panel, movable between a closed and open position;
   wherein said mounting section includes an angled resting structure, said angled resting structure for supporting said cover panel, when in the open position, away from said mounting section.

2. The system as claimed in claim 1, wherein said angled resting structure has a locking post configured to be passed through a receiving hole to support said cover panel in said open position.

3. The system as claimed in claim 2, wherein said locking post has a transverse locking pin.

4. The system as claimed in claim 1, wherein said angled resting structure has a spring-loaded locking post configured to be passed through a receiving hole to support said cover panel in said open position.

5. The system as claimed in claim 4, wherein said spring loaded locking post, has a rotatable handle connected by a pin to a shaft and, in turn to a spring, said shaft passing through a barrel, such that said handle can be either in a linear arrangement with said barrel in an open position, and where said handle can be rotated perpendicular to said barrel in a locked position.

6. The system as claimed in claim 1, wherein said angled resting structure is disposed at an angle away from said mounting section.

7. The system as claimed in claim 6, wherein said resting structure is angled at 30 degrees from said mounting section.

8. The system as claimed in claim 6 wherein said resting structure is angled to support said cover panel such that it supports said cover panel at the point when said hinge is unfolded to approximately 90°.

9. The system as claimed in claim 6 wherein said resting structure is angled to support said cover panel such that it supports said cover panel at a position that would contact said cover panel when the center of gravity just allows said cover panel to fall towards said mounting section.

10. A system for covering a launder channel of a clarifier tank, the launder channel having a tank wall and launder channel wall, said system comprising:
    a mounting section connected to said launder channel wall;
    a hinge;
    an openable cover panel, movable between a closed and open position;
    wherein said mounting section includes a locking post configured to be passed through a receiving hole to support said cover panel in said open position.

11. The system as claimed in claim 10, wherein said locking post a spring-loaded locking post configured to be passed through a receiving hole to support said cover panel in said open position.

12. The system as claimed in claim 11, wherein said spring loaded locking post, has a rotatable handle connected by a pin to a shaft and, in turn to a spring, said shaft passing through a barrel, such that said handle can be either in a linear arrangement with said barrel in an open position, and where said handle can be rotated perpendicular to said barrel in a locked position.

13. The system as claimed in claim 10, wherein said mounting section includes an angled resting structure on which said locking post is mounted, said angled resting structure for supporting said over panel, when in the open position, away from said mounting section.

14. The system as claimed in claim 13, wherein said angled resting structure is disposed at an angle away from said mounting section.

* * * * *